Patented Oct. 7, 1924.

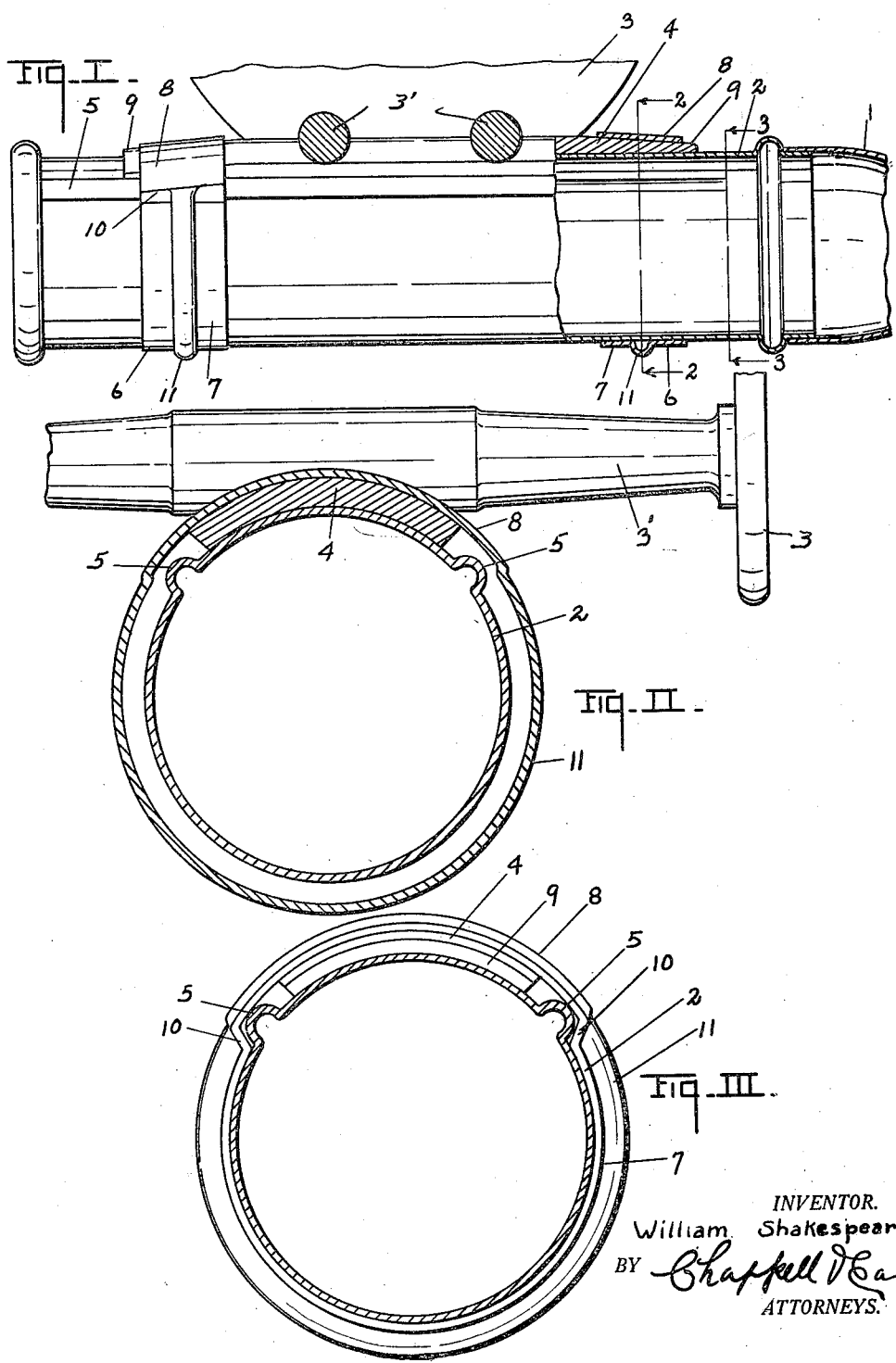

1,510,906

UNITED STATES PATENT OFFICE.

WILLIAM SHAKESPEARE, JR., OF KALAMAZOO, MICHIGAN, ASSIGNOR TO SHAKE-SPEARE COMPANY, OF KALAMAZOO, MICHIGAN.

REEL SEAT FOR FISHING RODS.

Application filed August 22, 1921. Serial No. 494,362.

*To all whom it may concern:*

Be it known that I, WILLIAM SHAKESPEARE, Jr., citizen of the United States, residing at Kalamazoo, county of Kalamazoo, State of Michigan, have invented certain new and useful Improvements in Reel Seats for Fishing Rods, of which the following is a specification.

This invention relates to improvements in reel seats for fishing rods.

The main object of this invention is to provide an improved reel seat for fishing rods which holds the reel very securely and at the same time one which is simple and economical in structure and easily adjusted to secure the reel or to release the same.

Further objects and objects relating to structural details, will definitely appear from the detailed description to follow.

I accomplish the objects of my invention by the devices and means described in the following specification. The invention is clearly defined and pointed out in the claims.

A structure which is the preferred embodiment of my invention is clearly illustrated in the accompanying drawings forming a part of this application, in which:

Fig. I is a detail side elevation of a reel seat for fishing rods embodying the features of my invention, partially in longitudinal section.

Fig. II is an enlarged detail transverse section on a line corresponding to line 2—2 of Fig. I.

Fig. III is an enlarged transverse section on a line corresponding to line 3—3 of Fig. I.

In the drawings similar reference characters refer to similar parts throughout the several views, and the sectional views are taken looking in the direction of the little arrows at the ends of the section lines.

Referring to the drawing, 1 represents a fishing rod and 2 the reel seat section thereof. A fishing reel is designated generally by the numeral 3, the reel having the usual bottom rods 3′ and is provided with the usual seat plate 4.

The rod member 2 is preferably provided with longitudinal ribs 5 adapted to receive the seat plate 4 between them.

I provide a pair of clamps designated generally by the numerals 6 and having cylindrically curved portions 7 slidably fitting the rod member 2, and offset tapered portions 8 embracing the longitudinal ribs 5 of the rod member and adapted to engage the tapered ends 9 of the reel seat plate 4.

The shoulders 10 formed by the offsets engage the ribs preventing rotating movement of the clamps on the rod member. The cylindrical portions 7 are preferably circumferentially beaded at 11, thereby stiffening the clamps and affording a grip portion or a portion which may be easily grasped.

It has been quite common practice to provide cylindrical clamps engaging over the tops of the ribs 5, but these yield more or less, allowing the reel to slip and the parts to become loosened, and further, it is difficult to adjust them tight enough to perfectly hold the reel in place.

By my improvements the reel is very securely held and the parts are very easily adjusted to clamp the reel or to release the same.

Having thus described my invention, what I claim as new and desire to secure by Letters Patent is:

1. In a reel seat for fishing reels, the combination of a rod member provided with longitudinal ribs spaced to receive the seat-plate of a reel between them, and a pair of oppositely disposed clamps slidable on said rod member and having cylindrically curved portions slidably fitting the rod member at the outside of said ribs and offset outwardly tapered portions adapted to engage a reel seat plate, the offsets constituting shoulders engaging the ribs whereby the clamps are supported against rotation on the rod member.

2. In a reel seat for fishing reels, the combination of a rod member provided with longitudinal ribs spaced to receive the seat-plate of a reel between them, and a clamp slidable on said rod member and having a cylindrically curved portion slidably fitting the rod member at the outside of said ribs and an offset outwardly tapered portion adapted to engage a reel seat plate, the offset constituting shoulders engaging the rib whereby the clamp is supported against rotation on the rod member.

In witness whereof, I have hereunto set my hand and seal in the presence of two witnesses.

WILLIAM SHAKESPEARE, Jr. [L. S.]

Witnesses:
ARTHUR L. BURRELL,
W. J. HARRISON.